Sept. 21, 1948. J. M. BRUNING 2,449,874
MACHINE FOR THE AUTOMATIC COOLING AND HEATING
OF BABY BOTTLES AND FOOD
Filed March 22, 1946

Inventor:
James M. Bruning

Patented Sept. 21, 1948

2,449,874

UNITED STATES PATENT OFFICE 2,449,874

MACHINE FOR THE AUTOMATIC COOLING AND HEATING OF BABY BOTTLES AND FOOD

James Milman Bruning, Mount Vernon, Wash.

Application March 22, 1946, Serial No. 656,495

15 Claims. (Cl. 257—4)

1

My invention relates to a unique arrangement and combination of a refrigerating system, a heating system, a control system, and an intermittently rotated bottle or food support of novel construction and design, all operating within one overall enclosed container, and the arrangement and combination of these various components resulting in an entirely new and useful machine; and the objects of my arrangement and combination of these components are, first, to provide in one machine the elements necessary for the cooling and subsequent heating of one or more baby bottles and food to within a selective temperature range; second, to provide means whereby a number of successive feedings may be automatically prepared for, without the usual inconveniences associated with individual and separate preparation of baby bottles and food for such successive feeding periods; third, to automatically bring and maintain the baby bottle contents and food to a temperature suitable for infant feeding at the time selected for the next feeding, even though the machine's operator may be then asleep; and fourth, to sound an audible alarm at the proper time thereby indicating that the bottle(s) and/or food are ready and that the preselected feeding time has arrived.

I attain these objects by mechanism illustrated in the accompanying drawing, in which—

Figure 1:
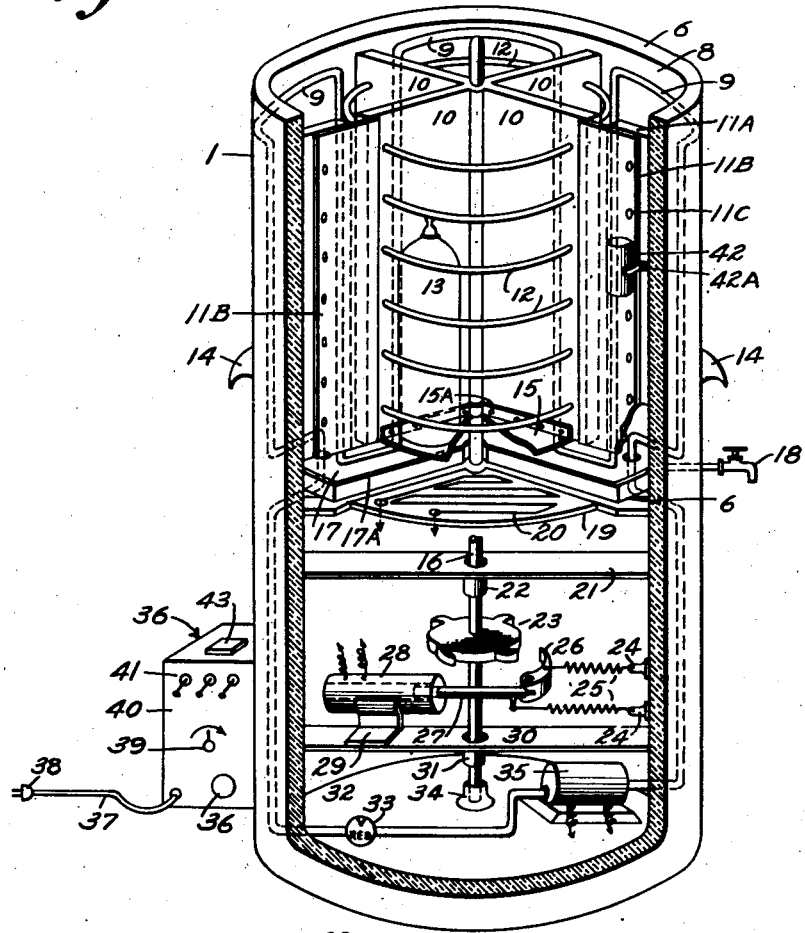
Figure 2:
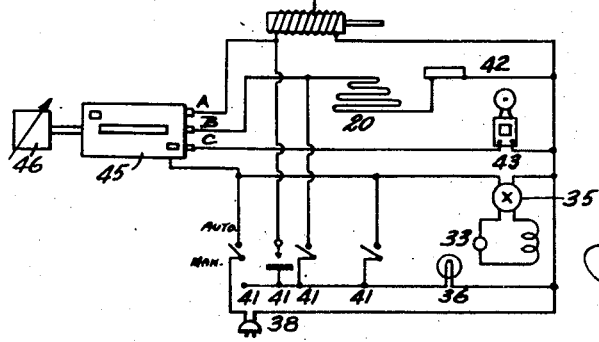

Figure 1 is an elongated perspective section, not to scale, of the entire machine; Figure 2, a schematic of the control circuit and mechanism necessary for the automatic functioning of the machine.

Similar numerals refer to similar parts throughout the several views.

1 is the outside container, lined with heat insulating material 6. Within the container is a baby bottle or food support consisting of essentially radial vanes of heat insulated material 10, with retaining rings 12 composed of low heat transfer material, and with separate metallic bottoms 15 individually secured to the vanes by a flange and screw system 15A.

The food support-vanes 10 are connected with an essentially vertical shaft 16 which extends longitudinally throughout the machine.

The shaft is supported at its bottom by thrust bearing 24, and is maintained in an essentially vertical position by bearings 31 and 22 and bearing supports 30 and 21. The upper portion of the shaft extends above the bottle support vanes so that when the cover 3 is placed on the machine, the shaft will ride in the upper bearing 7 mounted in the cover. Thus, the shaft is securely oriented

2 in the vertical direction and can be rotated with a minimum of effort.

Rotation of the food support is produced by rotation of its attached shaft heretofore described. To provide automatic rotation of this shaft, a toothed wheel 23 is firmly attached to said shaft, and so positioned that electrical operation of solenoid 28 will electro-magnetically draw plunger 27 further into the solenoid, will cause the pawl 26 to engage one of the teeth of wheel 23 and in turn will rotate the wheel and its associated shaft a desired amount, in the drawing as illustrated, this rotation per step will be ninety (90) degrees. The solenoid 28 is securely mounted by flange 29 to bearing support 30. During operation of solenoid plunger 27 retractile springs 25 attached to frame supports 24 were stretched, thus increasing their tension considerably. Pawl 26 is so hinged that it can bend inwardly toward the shaft, but cannot bend in the opposite direction. Thus, after plunger operation, and upon the de-energizing of solenoid 28, the plunger 27 and pawl 26 are returned to their normal position by retractile springs 25.

The cover 3 is equipped with knob 4 to facilitate handling. The outer surface of cover is of metal or plastic, the choice not being pertinent to the correct operation of the machine. However, the underside of cover 3, is of heat insulating material and when cover is in place this insulated material 6 is directly above and in very close proximity to the upper edges of the food support vanes 10.

Beneath the food support vanes 10, is a double diaphragm 17, containing a cut away segment approximately equal in angular dimensions to the angular spacing of the radially disposed vanes 10, directly above this diaphragm. The upper surface of diaphragm 17 is metallic, with an upturned flange or edge 17a to trap and hold moisture or water, etc., and this metallic top of diaphragm is piped to an external spigot or valve 18, to facilitate draining of condensate or of spilled liquids. The lower surface of diaphragm 17 is backed with heat insulation material 6. The diaphragm 17 is mounted immediately below and in very close proximity to the food support bottoms 15.

The arrangement of food support vanes 10, cover 3, and diaphragm 17 result in dividing the cylindrical space between cover 3 and diaphragm 17 into segmental compartments which are heat insulated from each other and from other parts of the machine.

One of these segmental compartments in the normal position of the machine will always rest immediately above the cut away section of the diaphragm 17. In this cut away space is mounted a heating coil 20, and its associated electrically insulated support 19. Whichever compartment is placed (by rotational functioning of shaft) above said heating coil 20, comes within the zone of influence of such heating coil, and such compartment is termed the "heating chamber." Heat is more perfectly sealed within this chamber by the action of several flexible heat retaining flaps 11B, which are mounted upon members 11A in turn attached to the inner wall of the container. The temperature within this heating chamber is controlled within narrow limits by thermostat 42, supported by strap 42A to mounting detail 11A.

All compartments other than the heating chamber are collectively known as the cooling chamber. On the inner wall of the machine, and within the space constituting the cooling chamber are mounted cooling coils 9, through which a refrigerant is pumped by refrigeration system 35 with its reducing valve 33 and other parts as needed for any typical refrigerating system.

Control mechanism located in control box 40 is schematically portrayed in Figure 2. No claim is made for this circuit, since the individual mechanisms are well established in engineering practice. However, the mechanisms required for the automatic functioning, timing and control of the basic machine heretofore described are as follows: A spring driven timing mechanism 46 controlled by timing selector 39 rotates drum 45 after a preselected interval set up within the timing mechanism 46. Drum 45 contains a number of insulating segments and a number of metallic segments, the combination resulting in a multiple switch equivalent to three single pole single throw electrical switches, diagrammed as 45A, 45B and 45C. The timing and sequence of circuit closures through the drum contacts are such that approximately thirty minutes before the time selected for the next feeding, contacts 45A will close for approximately ten seconds. This completes a circuit for energizing solenoid 28, in turn causing the plunger and pawl arrangement previously described to function and in turn, cause the food support vanes to be rotated an angular distance equal to their angular separation from each other. Thus, a compartment previously located in the cooling chamber is now brought within the zone of influence of heating coil 20. Simultaneously with or shortly after the closing of contacts 45A, contacts 45B are closed and remain closed for approximately thirty minutes, during which period the heating coil 20 is energized under control of thermostat 42. Thus, the heating chamber is brought to and maintained at a predetermined temperature within very narrow limits, this in turn resulting in the heating of the baby bottles or food now in the heating chamber and bringing the milk and/or food to a temperature proper for infant feeding. At the conclusion of the heating period of about thirty minutes, contacts 45C close for approximately ten seconds, during which time an alarm bell 43 is actuated to indicate that the food is at the proper temperature and that the preselected feeding time (set by timer 39) has arrived. Contacts 45A, 45B and 45C open their respective circuits immediately after the respective ten seconds, thirty minute, and ten second intervals, due to the further rotation of drum 45 by the clockwork mechanism 46.

To suspend the automatic features of the device, one of the control switches 41 is thrown from automatic to manual. In this position a warning lamp 36 is illuminated to indicate that the automatic functioning of the machine has been suspended, and to facilitate the removal of bottles or food from the machine. While manual control is in effect, operation of individual control switches 41 allow the rotation of food support member, the heating of the heating chamber, and the operation of the refrigerating system to whatever extent is desired by the machine's user. Power to the control circuit is connected through cord 37 and plug 38 which may be plugged into any 110 volt A. C. or D. C. socket.

To operate the complete machine, the electric plug 38 is inserted into a convenient 110 volt socket, and the control switch 41 is thrown to automatic. The timer 39 is set for the next desired feeding time. Bottles of milk and food as desired are placed in the individual compartments now within and comprising the cooling chamber and the cover is placed on the machine. Nothing is placed in the heating chamber at this time unless an immediate heating is desired. With the control switch set on automatic, the refrigeration system will commence to function and will chill whatever material has been placed in the compartments within the cooling chamber. Approximately one-half hour before the time selected by timing mechanism 39 and 46 for the next feeding, the entire food support will automatically be rotated sufficient to bring a previously cool compartment immediately above the heating coil 20. This coil will now become automatically energized and will supply heat to the compartment immediately above it, thus bringing the milk and food to the temperature set and controlled by thermostat 42. Upon completion of the heating period, the alarm bell 43 will sound. The user of the machine then lifts the cover, removes the milk bottle and food now heated, replaces cover and sets timer for next feeding period.

For convenience in carrying the machine, handle supports 14 are provided. Similarly, signal light 36 may be mounted at any convenient location on the outer portion of the machine as desired.

I claim:

1. A machine for the automatic cooling and heating of baby bottles and food comprising a heat insulated container, a rotary support for the bottles mounted in said container, means dividing said support into compartments, refrigerant means for cooling the bottles in certain of said compartments, heating means disposed in a station opposite one compartment, and means for intermittently rotating said compartments to and past said heating station.

2. A machine for the automatic cooling and heating of baby bottles and food comprising an insulated container, a support mounted for rotary motion in said container and having a plurality of compartments therein adapted to individually receive the bottles, a heating station of substantially the width of one compartment over which the bottles are adapted to be successively brought by the rotary motion of said support, means for intermittently rotating said support by successive angular distance equal to the width of one of said compartments, and refrigerant means for cooling all of said compartments except that at said heating station.

3. A machine for the automatic cooling and heating of baby bottles and food comprising an insulated container, a support mounted to rotate on a substantially vertical axis in said container and divided into a plurality of segmental compartments to removably receive the bottles, means to rotate said support step by step through an angular distance substantially equal to the width of a compartment, heating means in a heating station in said container so constructed and arranged as to exert a zone of heating influence throughout a single compartment into which heating station the bottles in the various compartments are successively brought by said intermittently rotating means, means for insulating the compartment at the heating station from the other compartments, and refrigerant means in the cabinet for subjecting said other compartments to its cooling action.

4. A machine for the automatic cooling and heating of baby bottles and food as claimed in claim 3 characterized by the fact that the compartments in said support are segmental, are accessible from their top portions for receiving and for the removal of the bottles, and have guard means at their outer portions.

5. A machine for the automatic cooling and heating of baby bottles and food according to claim 3 wherein the rotary support comprises substantially radial vanes of insulating material connected together at their circumferential portions by guard means and having their upper portions open for the receiving and removal of the bottles.

6. A machine for the automatic cooling and heating of baby bottles and food as claimed in claim 3 in which the support is comprised of substantially radial insulated vanes and compartment bottoms of metal connecting the lower portions of said vanes.

7. A machine for the automatic cooling and heating of baby bottles and food as claimed in claim 3 in which the side walls of the container carry inwardly projecting flexible insulating flaps disposed in the rotary path of the outer portions of said support.

8. A machine for the automatic cooling and heating of baby bottles and food as claimed in claim 3 in which a bottom diaphragm is carried in said container below said support having a cut-away portion opposite the heating station to receive said heating means.

9. A machine for the automatic cooling and heating of baby bottles and food as claimed in claim 3 in which a bottom diaphragm extends across the container just below said rotary support and has a segmental cut-away portion at the heating station to receive said heating means, said diaphragm having upstanding flanges at the edges of the cut-away portion rising in close proximity to said rotary support.

10. A machine for the automatic cooling and heating of baby bottles and food as claimed in claim 3, further comprising timing mechanism for causing the operation of said rotary support and for energizing said heating means for a desired interval of time.

11. A machine for the automatic cooling and heating of baby bottles and food as claimed in claim 3, further comprising an alarm, and timing mechanism adapted to cause the rotary movement of the support, the energizing of said heating means throughout a desired time interval and the subsequent actuation of said alarm following said time interval.

12. A machine for the automatic cooling and heating of baby bottles and food as claimed in claim 3, further comprising automatic temperature control means associated with said heating means at said heating station to maintain a selective range of temperature at said heating chamber and the compartment opposite the same.

13. A machine for the automatic cooling and heating of baby bottles and food as claimed in claim 3 in which an automatic timing device controls the step by step rotary motion of said support and the energizing and de-energizing of said heating means, a manual control for causing the step by step rotation of said support and the energizing and de-energizing of said heating means, means whereby either said manual or automatic controls may be put into operation, and a lamp included with said manual control and illuminated thereby when said manual control is effective, said lamp on the exterior of the container to both indicate that the device is on manual control and to give illumination for inserting and removing the bottles.

14. A machine for the automatic cooling and heating of baby bottles and food as claimed in claim 3, further comprising automatic means for causing the step by step rotary movement of said support and for the energizing and de-energizing of said heating means, and timing mechanism related to said automatic means whereby the automatic functions of said automatic means may be set in motion at a pre-selected future time.

15. A machine for the automatic cooling and heating of baby bottles and food as claimed in claim 3, further comprising an alarm, automatic means for causing the step by step rotation of said support, the energizing and de-energizing of said heating means and the actuation of said alarm on the de-energizing of said heating means, and time mechanism associated with said automatic means and settable to pre-selected future times for starting the operations of said automatic means to in sequence rotate the support, energize the heating means for a pre-selected time interval, de-energize said heating means and actuate said alarm.

JAMES MILMAN BRUNING.

REFERENCES CITED

The following references are of record in the file of this patent:

UNITED STATES PATENTS

| Number | Name | Date |
| --- | --- | --- |
| 1,860,302 | Thomas | May 24, 1932 |
| 1,979,222 | Goodwin | Oct. 30, 1934 |